(12) United States Patent
Umezawa

(10) Patent No.: US 7,325,981 B2
(45) Date of Patent: Feb. 5, 2008

(54) OPTICAL MODULE, MOUNTING METHOD OF THE SAME AND OPTICAL SYSTEM HAVING OPTICAL MODULE MOUNTED ON SUBSTRATE

(75) Inventor: Tomoki Umezawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/295,610

(22) Filed: Dec. 7, 2005

(65) Prior Publication Data

US 2006/0210217 A1    Sep. 21, 2006

(30) Foreign Application Priority Data

Mar. 15, 2005    (JP)    ............... 2005-072487

(51) Int. Cl.
  *G02B 6/36*    (2006.01)
(52) U.S. Cl. .............. 385/89; 385/14; 385/49; 385/88
(58) Field of Classification Search ............ 385/14–15, 385/49, 52, 88–91
  See application file for complete search history.

(56) References Cited

U.S. PATENT DOCUMENTS

| | | | | |
|---|---|---|---|---|
| 5,029,965 A | * | 7/1991 | Tan ............... | 385/90 |
| 6,112,002 A | * | 8/2000 | Tabuchi ............... | 385/50 |
| 6,272,271 B1 | * | 8/2001 | Wojnarowski et al. ......... | 385/52 |
| 6,484,602 B1 | * | 11/2002 | Dagalakis et al. ....... | 74/490.08 |
| 6,690,865 B2 | * | 2/2004 | Miyazaki ............... | 385/52 |
| 6,754,407 B2 | * | 6/2004 | Chakravorty et al. ......... | 385/14 |
| 6,870,195 B2 | * | 3/2005 | Lemoff et al. ............... | 257/79 |
| 2005/0175296 A1 | * | 8/2005 | Massey ............... | 385/90 |

FOREIGN PATENT DOCUMENTS

| | | |
|---|---|---|
| JP | A-11-307868 | 11/1999 |
| JP | A-2002-261401 | 9/2002 |
| JP | A-2004-117582 | 4/2004 |

\* cited by examiner

*Primary Examiner*—Hemang Sanghavi
(74) *Attorney, Agent, or Firm*—Morgan, Lewis & Bockius LLP

(57) ABSTRACT

An optical module mounting method for mounting an optical module including a plurality of light emitting points onto a substrate including an optical waveguide is provided. The method includes mounting the optical module on the substrate such that a surface of the optical module including the plurality of light emitting points faces one end of the optical waveguide; measuring optical coupling efficiency between each of the light emitting points and the optical waveguide; and selecting a light emitting point to be used based on the optical coupling efficiency measurements.

18 Claims, 4 Drawing Sheets

POSITION ADJUSTMENT

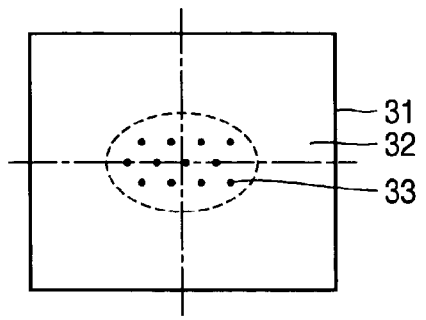
FIG. 3A
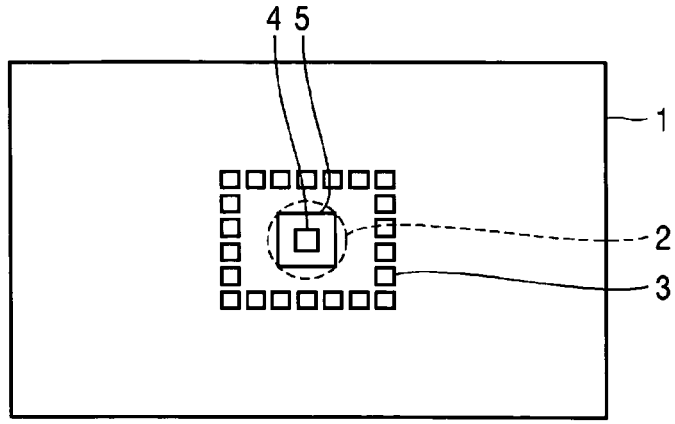
FIG. 3B
FIG. 3C
POSITION ADJUSTMENT
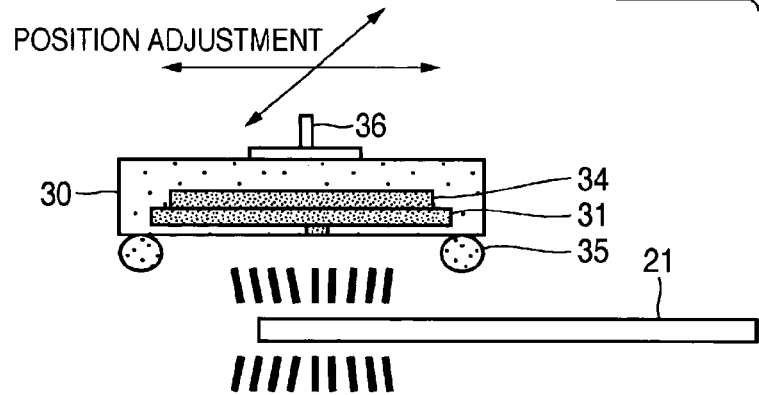
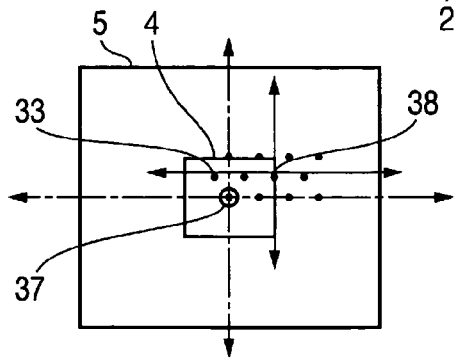
FIG. 3D
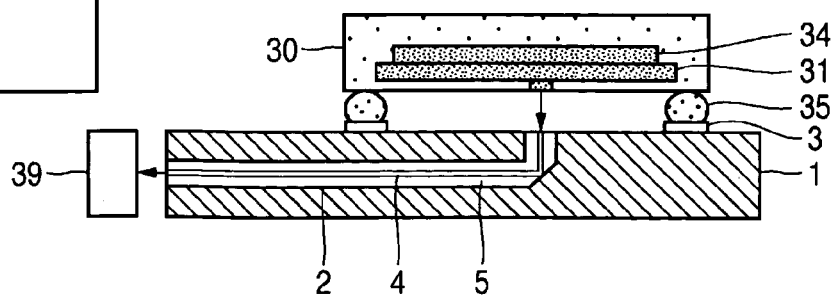
FIG. 3E

OPTICAL MODULE, MOUNTING METHOD OF THE SAME AND OPTICAL SYSTEM HAVING OPTICAL MODULE MOUNTED ON SUBSTRATE

This application claims the benefit of Japanese Patent Application No. 2005-072487 filed in Japan on Mar. 15, 2005, which is hereby incorporated by reference.

BACKGROUND OF THE INVENTION

1. Field of the Invention

The present invention relates to an optical module having a light emitting element, a mounting method of the same, and an optical module mounted substrate, and more particularly, to an optical module in which a surface light emitting element is used as a light emitting element, a mounting method of the same, and an optical module mounted substrate.

2. Description of the Related Art

When an optical module having a light emitting element is mounted on a waveguide substrate, the optical module must be very precisely positioned relative to the waveguide substrate. For example, when an optical multi-chip module (optical MCM) having a light emitting element is mounted on a substrate in which a waveguide is formed, positioning between a waveguide core and a light emitting point of the light emitting element must be positioned very precisely, for example, within ±5 µm or less. As the light emitting element, a surface light emitting element such as a VCSEL is generally used. For positioning (alignment), there are an active alignment method and a passive alignment method. Next, these methods will be described.

FIGS. 1A and 1B are views showing an example of positioning by the active alignment, in which FIG. 1A is a top view of a waveguide substrate, and FIG. 1B is a side view showing a method of mounting an optical module (optical MCM) on the waveguide substrate. As shown in FIG. 1A, a waveguide 2 and plural electrical connection pads 3 around it are provided on a waveguide substrate 1. The waveguide 2 includes a waveguide core 4 of, for example, about 50 µm×50 µm and a waveguide cladding 5 surrounding it. As shown in FIG. 1B, the waveguide 2 extends in the vertical direction from the upper surface of the waveguide substrate 1 to the inside, forms a reflecting surface at a halfway point, turns to the horizontal direction, and leads to the side surface of the waveguide substrate 1. A light receiving element 6 is provided at the side surface of the waveguide substrate 1. An optical MCM 7 includes a light emitting element 8 (for example, a surface light emitting element such as a VCSEL), an element drive circuit 9, and a bump 10 for electrical connection, and is held by a hand 11 for position adjustment. The active alignment is performed as described below. First, when the optical MCM 7 is mounted on the waveguide substrate 1, electric power is supplied to the optical MCM 7 during the mounting process, and the light emitting element 8 emits light. While the position of the optical MCM 7 is adjusted by the hand 11, the light from the light emitting element 8 is monitored by the light receiving element 6 provided at the side surface of the waveguide substrate 1 to find a position where coupling efficiency is high. When the coupling efficiency is high, the position of the optical MCM 7 is fixed by the bump 10. By this, the positioning using the active alignment is complete.

FIGS. 2A to 2C are views showing an example of positioning by the passive alignment, in which FIG. 2A is a top view of a waveguide substrate, FIG. 2B is a side view showing a method of mounting an optical module (optical MCM) on the waveguide substrate, and FIG. 2C is a view for explaining a method of positioning. In FIGS. 2A to 2C, the same reference numerals as those of FIG. 1 denote similar parts.

In the passive alignment, as shown in FIG. 2B, an upper/lower recognition camera 21 is used. The passive alignment is performed as described below. First, a light emitting point of a light emitting element 8 and a waveguide core are recognized by an image recognition device of a mount device through the upper/lower recognition camera 21, and as shown in FIG. 2C, an optical MCM 7 is moved by a position adjustment hand 11 so that a center position 12 of the light emitting point of the light emitting element 8 becomes coincident with a center position 13 of the waveguide core. That is, the positions are precisely adjusted within ±5 µm. When the positioning is precisely performed, the optical MCM 7 is fixed by a bump 10. By this, the positioning using the passive alignment is complete.

However, the related art is subject to a number of limitations. First, because the mount precision of a chip mounter used in typical surface mount technology (SMT) is approximately ±20 µm, sufficiently high precision mounting is not achieved. Alternatively, to perform the surface mount at high precision, expensive equipment is needed. In addition, since high precision positioning takes a long time, and therefore, mass production cannot be achieved with high precision according to the related art.

SUMMARY OF THE INVENTION

Accordingly, the present invention is directed to an optical module, a mounting of the same, and an optical system having an optical module mounted on a substrate that substantially obviates one or more of the problems due to limitations and disadvantages of the related art.

An object of the present invention is to provide an optical module mounting method in which high-precision positioning is not needed and in which mass productivity with high yield is achieved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical module mounting method for mounting an optical module including a plurality of light emitting points onto a substrate including an optical waveguide, the method comprises mounting the optical module on the substrate such that a surface of the optical module including the plurality of light emitting points faces one end of the optical waveguide; measuring optical coupling efficiency between each of the light emitting points and the optical waveguide; and selecting a light emitting point to be used based on the optical coupling efficiency measurements.

In another aspect, an optical system comprises an optical waveguide; and an optical module interfaced with the optical waveguide, the optical module including a plurality of light emitting points on a surface thereof, wherein a distance between adjacent ones of light emitting points are approximately ½ or less of a core size of the optical waveguide.

In another aspect, an optical system comprises an optical waveguide; and an optical module interfaced with the optical waveguide, the optical module including a plurality of light emitting points on a surface thereof, wherein one of the light emitting points is selected to be used among the plurality of light emitting points in view of optical coupling efficiency measurements of each of the light emitting points with the optical waveguide.

In another aspect, an optical system comprises a substrate including an optical waveguide; an optical module mounted onto the substrate, the optical module having a plurality of light emitting points on a surface thereof to emit light toward the substrate; and an element drive circuit to selectively cause the plurality of light emitting points to emit light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 1A and 1B are views showing an example of an active alignment positioning procedure in which FIG. 1A is a top view of a waveguide substrate, and FIG. 1B is a side view showing a method of mounting an optical module (optical MCM) onto the waveguide substrate;

FIGS. 2A to 2C are views showing an example of a passive alignment positioning procedure in which FIG. 2A is a top view of a waveguide substrate, FIG. 2B is a side view showing a method of mounting an optical module (optical MCM) onto the waveguide substrate, and FIG. 2C is a view illustrating a method of positioning;

FIGS. 3A to 3E are views showing a first exemplary embodiment of an optical module mounting method according to the present invention in which FIG. 3A is a view showing a light emitting surface of a surface light emitting element (VCSEL), FIG. 3B is a top view of a waveguide substrate, FIG. 3C is a side view showing a method of mounting an optical module (optical MCM) onto the waveguide substrate, FIG. 3D is a view showing a positional relation between a light emitting point of the surface light emitting element and a waveguide core, and FIG. 3E is a view showing an optical module mounted substrate in which the optical MCM is mounted (positioned) onto the waveguide substrate; and FIGS. 4A to 4C are views showing a second exemplary embodiment of an optical module mounting method according to the present invention in which FIG. 4A is a top view of a waveguide substrate having plural cores, FIG. 4B is a view showing a light emitting surface of a surface light emitting element (VCSEL), and FIG. 4C is a view showing a positional relation between a light emitting point of the surface light emitting element and a waveguide core.

DETAILED DESCRIPTION OF THE PREFERRED EMBODIMENTS

Figure 1A:
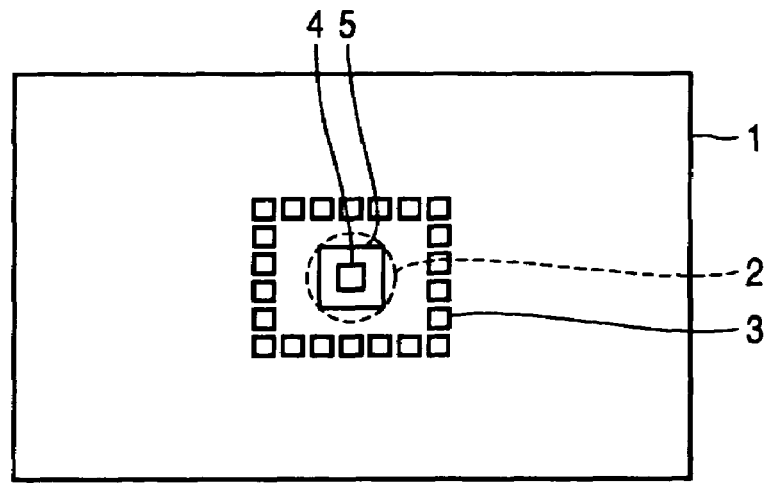
Figure 1B:
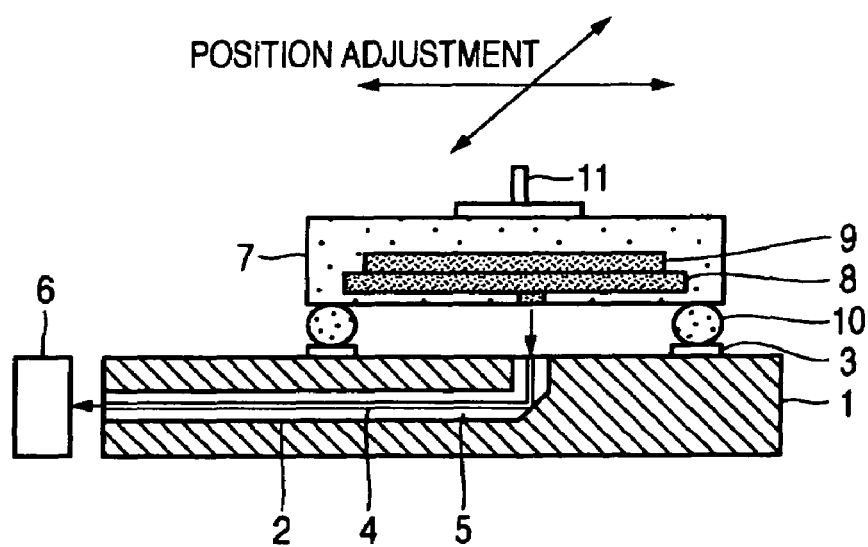
Figure 2A:
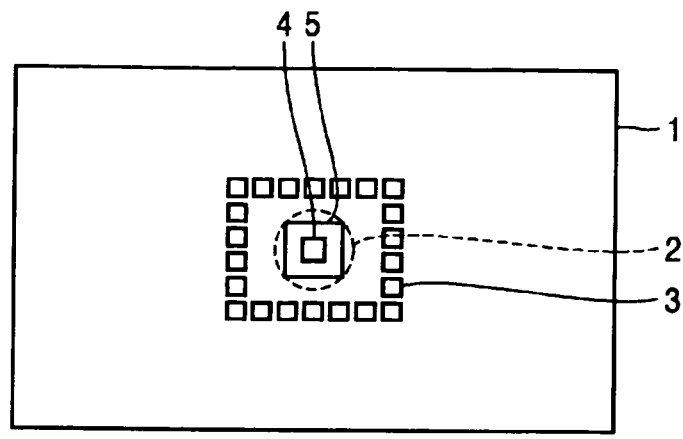
Figure 2B:
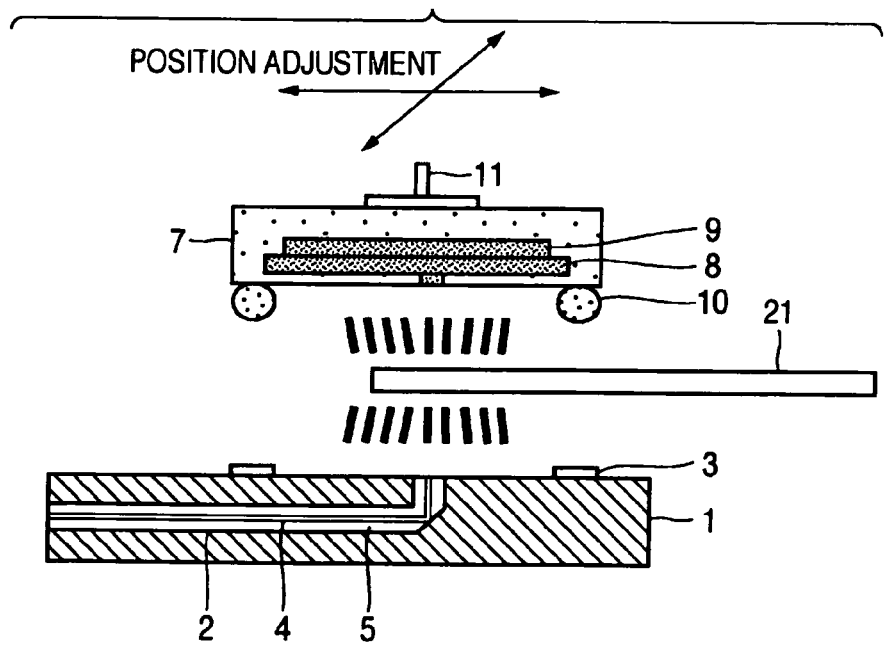
Figure 2C:
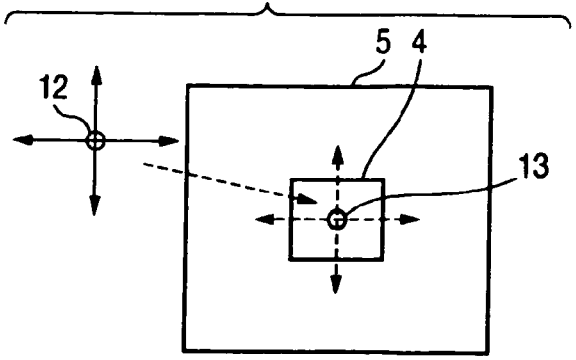

Reference will now be made in detail to the preferred embodiments of the present invention, examples of which are illustrated in the accompanying drawings.

The present invention will now be described in view of the specific embodiments of the invention. That is, in the present invention, a surface light emitting element having plural light emitting points more than the number of signal lines (optical waveguides) to be used serves as a light emitting source connected to an optical waveguide, and after the light emitting element is mounted on the substrate, optical coupling efficiency between each of the light emitting points and the optical waveguide is measured, and the light emitting point to be used in the surface light emitting element is selected based on the result. Here, the term "optical waveguide" has a broad meaning and includes an optical fiber in addition to the so-called waveguide. Besides, the optical coupling efficiency is obtained using, for example, a light receiving part (light receiving element) arranged through the optical waveguide and by making a measurement at each of the light emitting points of the light emitting element. In this case, it is desirable that the light emitting point is selected in descending order of the optical coupling efficiency. It is also possible to simultaneously select and use plural light emitting points for one optical waveguide. Besides, during the use period of the optical module, the selection of plural light emitting points can be used while the light emitting point is changed or while a light emitting point is added. Further, it is desirable that the optical module uses the light emitting element in which a distance (pitch) between the adjacent light emitting points is ½ or less of the size of an optical waveguide core (core diameter in the case of the optical fiber, core external shape in the case of the waveguide) of the connection object. Hereinafter, embodiments of the present invention will be described.

FIGS. 3A to 3E are views showing a first exemplary embodiment of an optical module mounting method according to the present invention, in which FIG. 3A is a view showing a light emitting surface of a surface light emitting element (VCSEL), FIG. 3B is a top view of a waveguide substrate, FIG. 3C is a side view showing a method of mounting an optical module (optical MCM) on the waveguide substrate, FIG. 3D is a view showing a positional relation between a light emitting point of the surface light emitting element and a waveguide core, and FIG. 3E is a view showing an optical module mounted substrate in which the optical MCM is mounted (positioned) on the waveguide substrate.

As shown in FIG. 3A, plural light emitting points 33 are arranged in an array form on a light emitting surface 32 of a surface light emitting element 31. A distance between the adjacent light emitting points 33 is, for example, 30 µm. As shown in FIG. 3B, a waveguide 2 and plural electrical connection pads 3 around it are provided on a waveguide substrate 1. The waveguide 2 includes a waveguide core 4 of, for example, about 50 µm ×50 µm and a waveguide cladding 5 surrounding it. As shown in FIG. 3C, one end of the waveguide 2 is disposed on the upper surface of the waveguide substrate 1, the wave guide 2 extends therefrom to the inside in the vertical direction, forms a reflecting surface at a halfway point, and turns to the horizontal direction, and the other end thereof leads to the side surface of the wave guide substrate 1. On the other hand, the optical MCM 30 includes a surface light emitting element 31, an element drive circuit 34 and a bump 35 for electrical connection, and is held by a position adjustment hand 36.

Relative positioning of the waveguide substrate 1 and the optical MCM 30 is performed by using an upper/lower recognition camera 21. That is, the plural light emitting points 33 of the surface light emitting element 31 and the waveguide core 4 are recognized by an image recognition device of a mount device through the upper/lower recognition camera 21. Based on this recognition result, the position adjustment of the optical MCM 30 is performed using the hand 36. In this case, it is unnecessary to perform positioning at high precision (approximately ±20 μm), and high speed mounting is possible by a normal mounter. The positional relation between the light emitting points 33 of the surface light emitting element 21 and the waveguide core at the time of mounting becomes, for example, as shown in FIG. 3D, and a center position 37 of the waveguide core 4 and a center position 38 of the light emitting surface 32 of the surface light emitting element 31 deviate from each other. However, the surface light emitting element 31 has the plural light emitting points 33, and one of them overlaps with the center position 37 of the waveguide core 4, or is disposed to be close thereto. Accordingly, as shown in FIG. 3E, the light of each of the light emitting points 33 is monitored by a light receiving element 39 provided at the side of the waveguide substrate 1 to find the light emitting point 33 where the optical coupling efficiency is highest. The light emitting point 33 where the optical coupling efficiency is highest is the light emitting point closest to the center position of the waveguide core 4, and using this light emitting point 33, high efficiency optical coupling becomes possible. The light emitting point 33 is driven by the element drive circuit 34. Incidentally, a distance (pitch) between the adjacent light emitting points is desirably made ½ or less of the size of the waveguide core external shape (when the waveguide core section is square, the length of its diagonal line).

As stated above, the optical coupling efficiency of each of the light emitting points 33 is measured by the light receiving element 39 provided at the other end of the waveguide 2, and the light emitting point 33 to be used is selected. In this case, the light emitting point 33 may be selected in the descending order of the optical coupling efficiency. The measurement result of the optical coupling efficiency is recorded, and it is unnecessary to make a measurement every time. If there are plural light emitting points corresponding to the waveguide core 4, when the light emitting point to be used is changed from the first selected one and another one is used during the use period of the optical module, a long-life optical module can be obtained. Alternatively, when the plural light emitting points are made to simultaneously emit light, the optical output can be improved. Further, when the number of light emitting points to be used is increased during the use period of the optical module, the amount of light can be kept at a constant level or higher. The change of the light emitting point, the simultaneous light emission of the plural light emitting points, or the addition of the number of light emitting points to be used can be performed by controlling the element drive circuit 34.

Figure 4A:
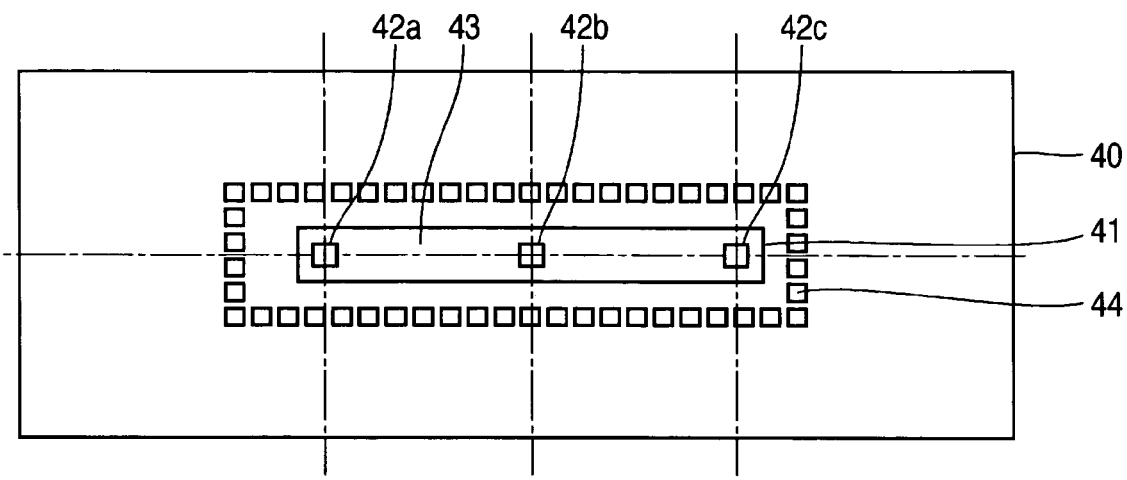
Figure 4B:
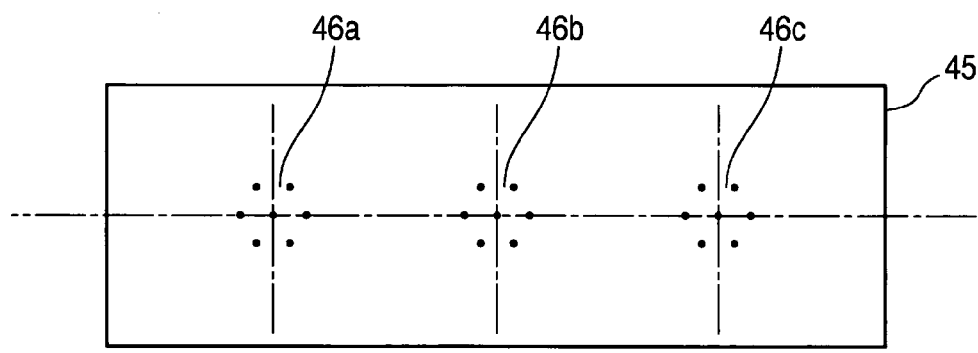
Figure 4C:
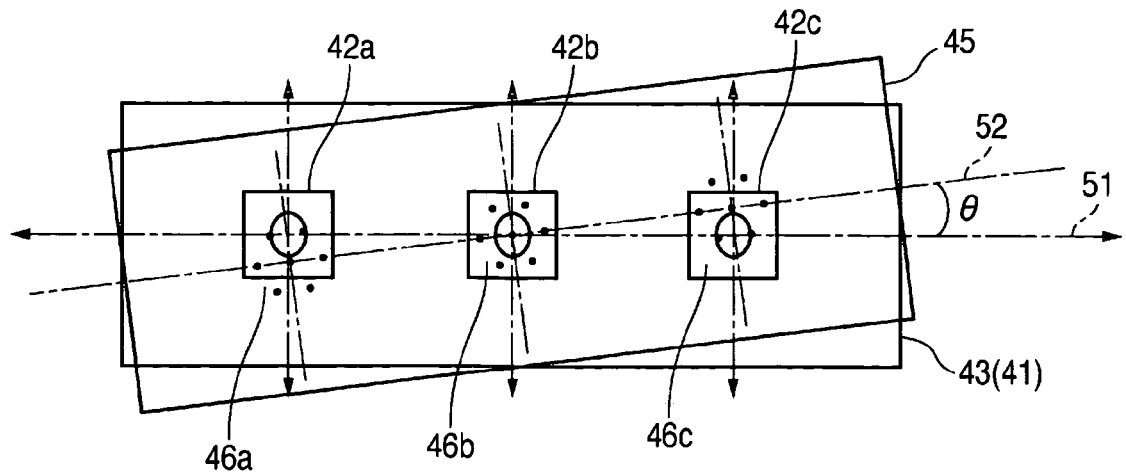

FIGS. 4A to 4C are views showing a second exemplary embodiment of an optical module mounting method according to the present invention, in which FIG. 4A is a top view of a waveguide substrate having plural cores, FIG. 4B is a view showing a light emitting surface of a surface light emitting element (VCSEL), and FIG. 4C is a view showing a positional relation between a light emitting point of the surface light emitting element and a waveguide core. Although this embodiment is basically similar to the mounting method of the first exemplary embodiment, a waveguide substrate has plural cores, and a surface light emitting element includes plural light emitting point groups correspondingly thereto.

In the second exemplary embodiment, as shown in FIG. 4A, a waveguide substrate 40 includes an optical waveguide 41 having plural waveguide cores 42a, 42b, 42c with a waveguide cladding 43 surrounding them, and electrical connection pads 44 further surrounding it. Although the waveguide cladding 43 is provided in common for the plural waveguide cores 42a, 42b and 42c in the illustrated example, it may be individually provided for each of the waveguide cores. As shown in FIG. 4B, the surface light emitting element 45 includes plural light emitting point groups 46a, 46b, and 46c each of which includes plural light emitting points respectively corresponding to the waveguide cores 42a, 42b, 42c. A distance (pitch) between adjacent light emitting points in each of the light emitting point groups may be made ½ or less of the size of a waveguide core external shape (when the waveguide core section is square, the length of its diagonal line). Since the plural light emitting points are disposed corresponding to the waveguide core, one or plural light emitting points (optical coupling efficiency is high) close to the center position of the waveguide core can be selected.

In accordance with the second exemplary embodiment, the precision of the inclination error of the light emitting element can be eased with respect to the waveguide substrate having the plural cores (channels) as will now be described. As shown in FIG. 4C, a center line 52 of the surface light emitting element 45 is inclined by an angle θ with respect to a center line 51 of the waveguide substrate 40 (waveguide cladding 43). Also, one or plural light emitting points in each of the light emitting point groups 46a, 46b, 46c corresponding to the waveguide cores 42a, 42b, 42c exist at correspondence positions to the waveguide cores 42a, 42b and 42c. Then, by a similar method as the first exemplary embodiment, a light emitting point close to the center position of each waveguide core 42a, 42b, 42b is selected from each of the light emitting point groups 46a, 46b, 46c, and this light emitting point is used, so that the optical module mounted substrate having high optical coupling efficiency can be obtained.

In the above embodiment, although the description has been made on the assumption that the object of the positioning with respect to the surface light emitting element is the waveguide embedded in the substrate, even when the object of the positioning is a waveguide using an optical fiber, the positioning can be performed in the same manner. In this case, a distance (pitch) between adjacent light emitting points can be ½ or less than the size of the diameter of an optical fiber core.

As described above, since high-precision positioning becomes unnecessary when the light emitting element is mounted on the waveguide substrate, expensive equipments are not required. Also, since the positioning time can be shortened, an enhanced mass productivity is obtained. Further, since the cost of the light emitting element is mainly determined by the external size of the element, even when the light emitting points are disposed in an array form, an additional cost is low, and in total, the low cost optical module mounted substrate can be obtained. In addition, as stated above, the initial light emitting point is changed to another light emitting point and it can be used, and by that, a long-life optical module can be provided. Further, when the plural light emitting points are made to simultaneously emit light, the optical output can be improved. Thus, according to an aspect of the present invention, the optical module mounting method which does not require high-precision positioning and provides an enhanced mass productivity can be obtained.

It will be apparent to those skilled in the art that various modifications and variations can be made in the optical module, the mounting of the same, and the optical system having an optical module mounted on a substrate of the present invention without departing from the spirit or scope of the invention. Thus, it is intended that the present invention cover the modifications and variations of this invention provided they come within the scope of the appended claims and their equivalents.

What is claimed is:

1. An optical module mounting method for mounting an optical module including a plurality of light emitting points onto a substrate including an optical waveguide having a waveguide core with a square section, the method comprising:
    mounting the optical module on the substrate such that a surface of the optical module including the plurality of light emitting points faces one end of the optical waveguide;
    measuring optical coupling efficiency between each of the light emitting points and the optical waveguide; and
    selecting a light emitting point to be used based on the optical coupling efficiency measurements.

2. The optical module mounting method according to claim 1, wherein the optical coupling efficiency is measured using a light receiving element provided at the other end of the optical waveguide.

3. The optical module mounting method according to claim 1, wherein the selected light emitting point is the light emitting point having the greatest optical coupling efficiency.

4. The optical module mounting method according to claim 1, wherein selection of the light emitting point is performed with respect to the plurality of light emitting points.

5. The optical module mounting method according to claim 1, wherein the selected light emitting point changeable to another light emitting point during a use period of the optical module with the optical waveguide.

6. The optical module mounting method according to claim 1, further comprising selecting at least a second light emitting point to be used with the optical module based on the optical coupling efficiency measurements, wherein the first and second light emitting points are used simultaneously during the use period of the optical module.

7. The optical module mounting method according to claim 1, wherein the plurality of light emitting points are surface light emitting points disposed on the surface of the optical module.

8. The optical module mounting method according to claim 1, wherein the plurality of light emitting points are disposed in a plurality of groups, and wherein the substrate has a plurality of optical waveguides, each group corresponding to a respective one of the optical waveguides.

9. An optical system, comprising:
    an optical waveguide including a waveguide core with a square section; and
    an optical module interfaced with the optical waveguide, the optical module including a plurality of light emitting points on a surface thereof,
    wherein a distance between adjacent ones of light emitting points are approximately ½ or less of a length of a diagonal line of the square section of the waveguide core.

10. The optical system according to claim 9, wherein the optical waveguide is an optical fiber, and the core size is a diameter of an optical fiber core.

11. The optical system according to claim 9, wherein the plurality of light emitting points are disposed on a surface of the optical module in a plurality of groups, and wherein the optical module is interfaced with a plurality of optical waveguides such that each group corresponds to a respective one of the optical waveguides.

12. An optical system, comprising:
    an optical waveguide including a waveguide core with a square section; and
    an optical module interfaced with the optical waveguide, the optical module including a plurality of light emitting points on a surface thereof,
    wherein one of the light emitting points is selected to be used among the plurality of light emitting points in view of optical coupling efficiency measurements of each of the light emitting points with the optical waveguide.

13. The optical system according to claim 12, wherein the selected light emitting point is the light emitting point having the greatest optical coupling efficiency.

14. The optical system according to claim 12, wherein at least a second light emitting point to be used with the optical module is selected in view of the optical coupling efficiency measurements such that the first and second light emitting points are used simultaneously during the use period of the optical module.

15. The optical system according to claim 12, wherein the selected light emitting point is changeable to another light emitting point during a use period of the optical module with the optical waveguide.

16. An optical system, comprising:
    a substrate including an optical waveguide having a waveguide core with a square section;
    an optical module mounted on the substrate, the optical module having a plurality of light emitting points on a surface thereof to emit light toward the substrate; and
    an element drive circuit to selectively cause the plurality of light emitting points to emit light to the optical waveguide.

17. The optical system according to claim 16, wherein at least one of the plurality of light emitting points is optically interfaced with the optical waveguide.

18. The optical system according to claim 16, wherein the plurality of light emitting points are disposed on a surface of the optical module in a plurality of groups, and wherein the substrate includes a plurality of optical waveguides such that each group corresponds to a respective one of the optical waveguides.

* * * * *